US006923865B2

(12) United States Patent
Serafin et al.

(10) Patent No.: US 6,923,865 B2
(45) Date of Patent: Aug. 2, 2005

(54) CLASSIFICATION OF COATING PARTICLE SIZE

(75) Inventors: Mark Serafin, Apple Valley, MN (US); Stanley R. Ellis, Mahtomedi, MN (US); Leroy C. Erickson, Blaine, MN (US); Scott A. Walker, White Bear Lake, MN (US); Daniel W. Brandt, Stillwater, MN (US)

(73) Assignee: Imation Corp., Oakdale, MN (US)

( * ) Notice: Subject to any disclaimer, the term of this patent is extended or adjusted under 35 U.S.C. 154(b) by 316 days.

(21) Appl. No.: 10/112,987

(22) Filed: Mar. 29, 2002

(65) Prior Publication Data

US 2003/0185974 A1 Oct. 2, 2003

(51) Int. Cl.[7] .............................................. B05C 11/00
(52) U.S. Cl. ...................... 118/610; 118/608; 118/603
(58) Field of Search ................................ 118/602, 603, 118/608, 610; 209/268, 273, 379, 17, 381, 234; 241/5, 79, 80

(56) References Cited

U.S. PATENT DOCUMENTS

| | | | |
|---|---|---|---|
| 2,819,835 A | | 1/1958 | Newhall |
| 3,234,882 A | | 2/1966 | Douglas et al. |
| 3,263,817 A | * | 8/1966 | Buckley |
| 3,502,213 A | * | 3/1970 | Kuribayashi |
| 3,852,191 A | * | 12/1974 | Zucker et al. |
| 4,412,792 A | | 11/1983 | LaBorde et al. |
| 4,435,133 A | | 3/1984 | Meulendyk |
| 4,527,954 A | | 7/1985 | Murali et al. |
| 4,533,254 A | | 8/1985 | Cook et al. |
| 4,701,112 A | | 10/1987 | Eisenhut et al. |
| 5,226,963 A | * | 7/1993 | Shibata et al. |
| 5,241,986 A | | 9/1993 | Yie |
| 5,260,360 A | | 11/1993 | Mrozinski et al. |
| 5,401,899 A | * | 3/1995 | Bryant et al. |
| 5,482,077 A | | 1/1996 | Serafin |
| 5,507,624 A | | 4/1996 | Fehn |
| 5,852,076 A | | 12/1998 | Serafin et al. |
| 5,865,029 A | | 2/1999 | Brieschke |
| 5,879,137 A | | 3/1999 | Yie |
| 6,074,700 A | * | 6/2000 | Roitto |
| 6,135,069 A | | 10/2000 | Fenelon et al. |

FOREIGN PATENT DOCUMENTS

| | | |
|---|---|---|
| EP | 0792 194 B1 | 9/1997 |
| WO | WO 92/22748 | 12/1992 |

OTHER PUBLICATIONS

Huisman H.F., "Dispersion of (Magnetic) Pigment Powders in Organic Liquids," Journal of Coatings Technology 57(727): 49–56 (1985).

(Continued)

*Primary Examiner*—Brenda A. Lamb
(74) *Attorney, Agent, or Firm*—Eric D. Levinson

(57) ABSTRACT

Techniques for precisely controlling the size of particles in a coating solution delivered to a coating apparatus involve continuous classification of coating particle size using a tangential flow filter assembly. The techniques may be particularly useful in the preparation of coating dispersions for manufacture of magnetic recording media. A classification technique makes use of a tangential flow filter assembly that permits delivery of coating particles below a maximum size threshold to a coating path. The filter assembly may be disposed in a circulation path that includes one or more processing devices to reduce the size of coating particles carried by a coating solution. The filter assembly enables coating particles above the maximum size threshold to be recirculated through the circulation path and subjected to repeated processing to reduce particle size to a desired size range.

24 Claims, 8 Drawing Sheets

OTHER PUBLICATIONS

Winkler J. et al., "Theory for the Deagglomeration of Pigment Clusters in Dispersion Machinery by Mechanical Forces. I," Journal of Coatings Technology 59(754): 35–41 (1987).

Winkler J. et al., "Theory for the Deagglomeration of Pigment Clusters in Dispersion Machinery by Mechanical Forces. III," Journal of Coatings Technology 59(754): 55–60 (1987).

Winkler J. et al., "Theory for the Deagglomeration of Pigment Clusters in Dispersion Machinery by Mechanical Forces. II," Journal of Coatings Technology 59(754): 45–53 (1987).

"Advanced Analytical Biochemistry," NgeeAnn School of Life Sciences and Chemical Technology, www.np.edu.sg/~dept–bio/biochemistry/aab/topics/aab principles.htm, 5 pages, printed Jan. 20, 2005.

* cited by examiner

CLASSIFICATION OF COATING PARTICLE SIZE

TECHNICAL FIELD

The invention relates to liquid coating and, more particularly, techniques for controlling the absolute size of particulate structures within a liquid coating solution.

BACKGROUND

Dispersions of hard, non-compliant particles are used in a variety of industrial processes including preparation of abrasive coatings, inks, paints, and the like. In addition, fluid dispersions of hard particles are used extensively in the coating of magnetic media, such as magnetic disks and tape for audio, video or data storage. In particular, the dispersion may contain magnetic pigment particles and a polymeric binder carried in a solvent. The coating process involves application of the dispersion to a substrate, followed by drying to remove the solvent, to form a magnetic recording medium.

For high-density magnetic media, the size and uniformity of the magnetic pigment particles is extremely important. To produce magnetic particles in a desired size range, coating processes often make use of media mills such as ball mills, sand mills or attritors. In each case, the media mill is designed to achieve acceptable magnetic dispersions by subjecting the pigment particles to high intensity microshearing. In this manner, the media mill breaks down agglomerations of the pigment particles, producing desired particle sizes. The media mill may not be completely effective, however, in reducing all of the pigment particles to the desired size range.

Filtration of coating dispersions generally is accomplished by filtering the solution through a series of restrictive filter elements. This type of filtration process is known as challenge, or dead-end filtration, where all of the solution is directed to flow through the thick wall of the filter media, i.e., "challenging" the media. The larger particles are trapped throughout the complex openings of the filter media matrix.

SUMMARY

The invention is directed to techniques for precisely controlling the size of particles in a coating solution delivered to a coating apparatus. In particular, the invention involves continuous classification of coating particle size using a tangential flow filter assembly. The invention may be particularly useful in the preparation of coating dispersions for manufacture of magnetic recording media.

A classification technique in accordance with the invention makes use of a tangential flow filter assembly that permits delivery of coating particles below a maximum size threshold to a coating path. The filter assembly may be disposed in a circulation path that includes one or more processing devices to reduce the size of coating particles carried by a coating solution. The filter assembly enables coating particles above the maximum size threshold to be recirculated through the circulation path and subjected to repeated processing to reduce particle size to a desired size range.

Tangential flow filtration is capable of reducing fouling of the filter media surface by directing across the surface of the filter media, thereby effecting a sweeping action of the solution flow tangentially across the media. In this manner, the solution is capable of generating sufficient velocity and shear at the surface of the media so as to reduce the formation of a particulate layer that clogs the filter media.

In some embodiments, the filter assembly may include a series of two or more filter elements having progressively smaller pore sizes from the upstream side to the downstream side. The filter elements successively filter down the size of the particles so that only the smallest particles, i.e., capable of passing through the smallest filter, are fed to a coating apparatus. In this manner, the coating apparatus receives particles having particle sizes less than a particular size. As an alternative, particles that are capable of passing through one or more larger pore size filters but incapable of passing through a smaller pore size filter disposed downstream may be extracted to supply particles within a desired particle size range having upper and lower bounds.

In addition, a vibration device can be used to impart vibratory motion to the filter assembly and thereby reduce clogging of the filter element. A backflow device also may be used to apply a backflow of coating solution to the filter element and thereby reducing clogging. In this manner, the invention may be configured to continuously classify extremely small particles without excessive maintenance requirements.

In one embodiment, the invention provides a system comprising a supply of coating solution containing substantially non-compliant coating particles, and a pump, coupled to the supply, that delivers the coating solution along a circulation path. A processing apparatus, disposed within the circulation path, processes the coating particles. A tangential flow filter assembly, disposed within the circulation path, delivers coating particles having sizes less than a threshold size from the circulation path to a coating path, and returns coating particles having sizes greater than the threshold size to the supply via the circulation path.

In another embodiment, the invention provides a method comprising delivering a coating solution containing substantially non-compliant coating particles from a supply along a circulation path, and passing the coating solution through a tangential flow filter assembly to deliver coating particles having sizes less than a threshold size to a coating path and return coating particles having sizes greater than the threshold size to the supply via the circulation path.

In an added embodiment, the invention provides a system comprising a supply of coating solution containing substantially non-compliant coating particles, a pump, coupled to the supply, that delivers the coating solution along a circulation path, a processing apparatus, disposed within the circulation path, that processes the coating particles, and a tangential flow filter assembly, disposed within the circulation path, that delivers coating particles having sizes less than a first threshold size and greater than a second threshold size from the circulation path to a coating path, and returns coating particles having sizes greater than the first threshold size and less than the second threshold size to the supply via the circulation path.

In a further embodiment, the invention provides a method comprising delivering a coating solution containing substantially non-compliant coating particles from a supply along a circulation path, and passing the coating solution through a tangential flow filter assembly to deliver coating particles having sizes less than a first threshold size and greater than a second threshold size to a coating path and return coating particles having sizes greater than the threshold size and less than the second threshold size to the supply via the circulation path.

The invention can provide a number of advantages. For example, the invention can be effective in continuously and precisely controlling the maximum size of particles fed to the coating path. In addition, the invention permits particles with sizes above a threshold to be returned to the circulation path for additional processing to drive the particle sizes to the desired ranged. By adding vibration, backflushing, or both, the invention can clean the filter element, slow growth of accumulated particles on the filter element, and significantly extend the processing time between maintenance operations.

The details of one or more embodiments of the present invention are set forth in the accompanying drawings and the description below. Other features, objects, and advantages of the present invention will be apparent from the description and drawings, and from the claims.

DESCRIPTION OF DRAWINGS

Like reference numbers and designations in the various drawings indicate like elements.

DETAILED DESCRIPTION

Figure 1:
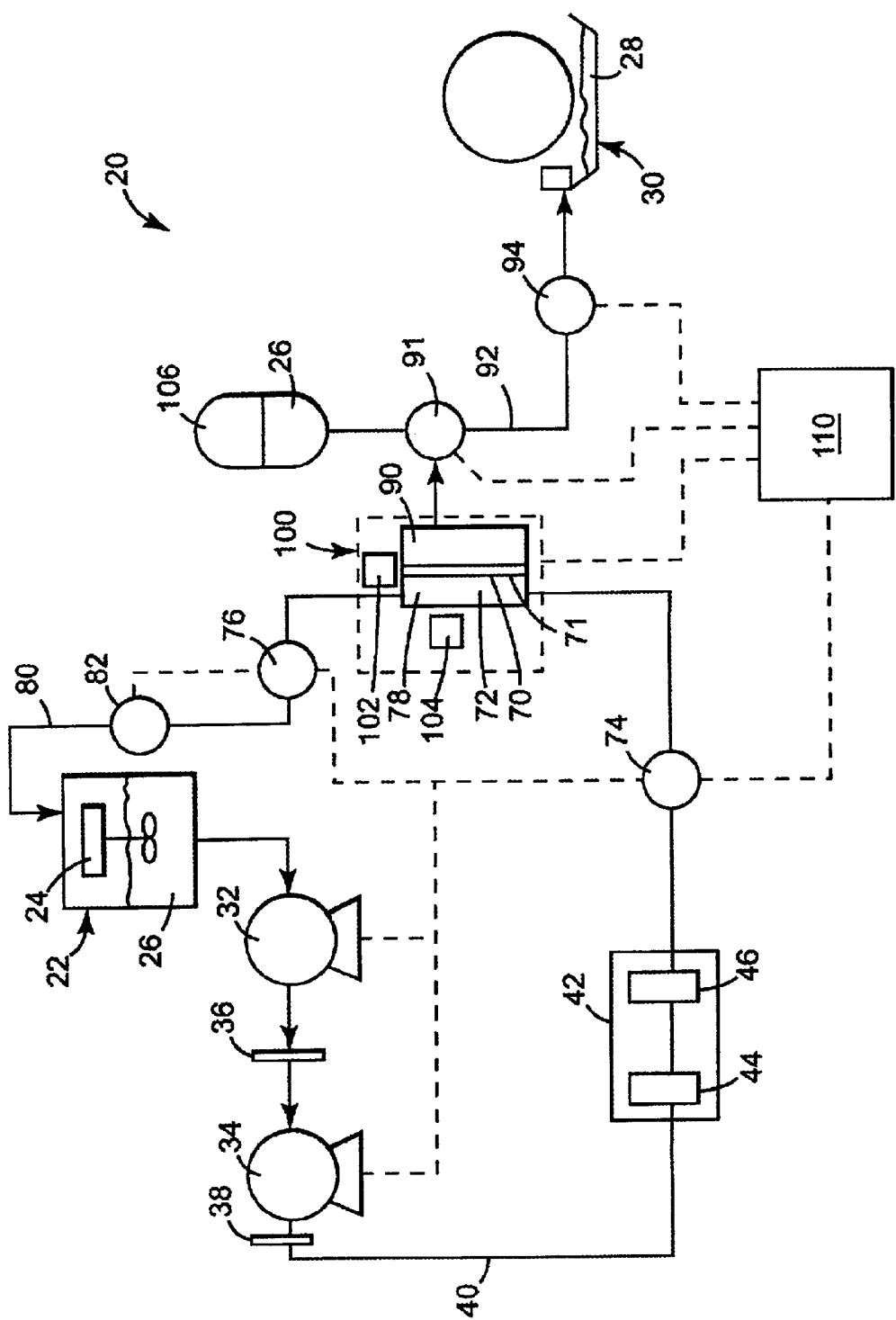
FIG. 1 is a schematic diagram of a coating system incorporating a classification device in accordance with the invention.

FIG. 1 is a schematic diagram of a coating particle classification system 20 in accordance with the invention. Classification system 20 may be especially useful in processing coating solutions having higher concentrations of solids. For example, classification system 20 may be particularly useful in processing coating solutions having a solids content of greater than approximately ten percent by weight, and especially greater than 15 percent by weight. Also, such a coating solution may carry hard, substantially non-compliant particles, such as magnetic pigments used for coating of magnetic media.

In FIG. 1, classification system 20 is illustrated in the context of an overall system for preparation and delivery of a coating solution. As will be described, system 20 includes a number of features useful in precisely controlling the size of particles dispersed in the coating solution ultimately delivered to a coating apparatus. Coating particles that exceed a maximum size threshold can be recirculated and subjected to repeated processing operations to achieve a desired particle size. In this manner, system 20 can be effective in maintaining the quality of the coating.

As shown in FIG. 1, a coating solution vessel 22 includes a mixing element 24 that mixes an amount of hard, generally non-compliant particles, one or more solvents, and optionally other materials to form a coating solution 26. In some embodiments, mixing element 24 may take the form of a double planetary mixer. Additional materials may be added to coating solution 26 at other points between coating vessel 22 and a coating apparatus 28. Accordingly, coating solution vessel 22 may or may not contain all of the ingredients of a final liquid coating solution 28 applied to a substrate by a coating apparatus 30.

In the example of FIG. 1, system 20 defines a circulation path that transmits coating solution 26. One or more intensifier pumps 32, 34 serve to draw coating solution 26 from coating vessel 22 and deliver the coating solution along the circulation path at a desired pressurization. A first intensifier pump 32, for example, may be capable of generating approximately 100 to 150 psi (300 to 1,000 kPa) of fluid pressure. A second intensifier pump 34, located downstream from pump 32, may further intensify dispersion 26 to greater than 30,000 psi (205 MPa). Check valves 36, 38 can be located upstream from pumps 32, 34, respectively, to prevent backflow of coating solution 26.

Following pressurization, dispersion 26 travels via conduit 40 to a processing device 42 that reduces the size of the coating particles to a desired range. The processing device may include a series of impingement chambers 44, 46. Impingement chambers 44, 46 may be constructed substantially as described in U.S. Pat. No. 5,852,076 to Serafin et al., the entire content of which is incorporated herein by reference.

In general, impingement chambers 44, 46 serve to break down the particles into smaller sizes and produce a finely dispersed coating solution. Heat exchangers may be disposed in the circulation path following impingement chambers 44, 46, respectively, to dissipate excess thermal energy generated in coating solution 26 during processing within impingement chambers 44, 46. In some embodiments, coating solution 26 is not re-pressurized following exit from processing device 42.

The pressurized coating solution 26 flows through a conduit 64 from processing device 42 to tangential flow filter assembly 100. Tangential flow filter assembly 100 may include one or more filter elements 70 within a filter assembly 72. Filter element 70 may take the form of a porous membrane having a pore size selected to deliver coating particles having sizes less than a threshold size from the circulation path to a coating path that feeds coating apparatus 30. Filter element 70 returns coating particles having sizes greater than the threshold size to the coating vessel 22 via the circulation path.

The pressurized coating solution 26 in conduit 64 is directed tangentially across filter element 70 in a tangential flow region 78. In some embodiments, filter assembly 72 is readily removable removed from tangential flow assembly 100 so that filter elements with different pore sizes can be substituted. As used herein, "porous membrane" generally refers to a polymeric matrix have a pathway extending from a first surface to a second surface. The pore sizes may not be uniform across the membrane. For purposes of the invention, the porous membranes can be characterized in terms of a maximum pore size that determines to the largest particle that can pass through the membrane A variety of porous membranes can be used as filter element 70. A membrane having a porous polymeric matrix with desirable pore sizes is described, for example, in U.S. Pat. No. 5,260,360 to Mrozinski et al. Mrozinski discloses a membrane having a multiplicity of randomly dispersed, irregularly shaped, thermoplastic particles. A portion of the thermoplastic particles are spaced from one another to provide a network of pathways or pores. A portion of the spaced thermoplastic particles are connected to each other by fibrils.

A porous polymeric matrix is any material having generally continuous minute openings having pores or pathway through its thickness. In addition, sheets having solid, or non-porous areas and porous areas may be employed for particular applications. The pore size of a matrix will be much smaller than the matrix thickness.

Tangential flow filter assembly 100 may include one or more vibrators 102, 104. Vibrators 102, 104 impart a vibratory force to filter element 70 to prevent coating particles of a size larger than the pore size of the filter element from accumulating on an upstream surface 71 exposed to tangential flow region 78. Vibrators 102, 104 may impart a vibratory force to filter element 70 in three dimensions.

A trans-membrane pressure regulating valve 76, located downstream from filter assembly 72, controls the pressure of coating solution 26 in tangential flow region 78 of the membrane assembly. A pressure transducer 74 measures the pressure of the coating solution 26 near the input 74 of tangential flow region 78. The relative size of the coating particles in coating solution 26 and the size of the pores in filter element 70 will determine the amount of trans-membrane pressure required in order to achieve solution flow through the porous membrane 70. During continuous classification of coating solution 26, the pressure of coating solution in tangential flow region 78 is greater than in manifold 90 on the opposite side of the filter element 70. In this manner, a portion of coating solution 26 flowing through the filter element 70 is directed to manifold 90 in the membrane assembly 72.

A portion of coating solution 26 will contain particles that are larger than the pore size of the filter element 70. Consequently, a portion of the coating solution 26 in the tangential flow region 78 will not pass through filter element 70. Other portions of coating solution 26 may flow through the tangential flow region 78 without encountering filter element 70. Coating particles that are too large to pass through filter element 70 will travel with coating solution 26 along the circulation path and return to coating vessel 22. In particular, excess coating solution 26 that does not pass through filter element 70 flows to conduit 80, where it is measured by flow meter 82 and returned to the coating solution vessel 22.

The larger coating particles that do not pass through filter element 70 for delivery to coating apparatus 30 are not trapped. Instead, the coating particles are recirculated with coating solution 26 through system 20 for further processing. In this manner, the size of the coating particles can be progressively reduced by reprocessing within processing device 42. Upon one or more recirculation cycles, the coating particles should eventually reach a size that permits them to pass through filter element 70 for delivery to coating apparatus 30. This technique ensures that coating solution 26 delivered to coating apparatus 30 carries coating particles in the appropriate size range, thereby helping to maintain the quality of the coated article. In addition, the coating particles are recirculated and not wasted. Consequently, system 20 ensures that substantially all of coating solution 26 is eventually passed through tangential flow filter assembly 100 to coating apparatus 30.

In the example of FIG. 1, the portion of coating solution 26 that passes through filter element 70 flows through a manifold 90 to a three-way valve 91. The valve 91 directs coating solution 26 through conduit 92 and valve/flow meter 94 to coating apparatus 30. As discussed above, in one embodiment, no re-pressurization of coating solution 26 is required between pressurization by pumps 32, 34 and delivery of the coating solution to coating apparatus 30.

A valve 91 and valve/flow meter 94 can be used to direct a portion of the pressurized coating solution 26 to an accumulator 106. Pressurized coating solution 26 in the accumulator 106 can be intermittently directed back into the manifold 90 to create a reverse flow through filter element 70. Reverse flow of coating solution 26 through filter element 70 can be effective in removing accumulated particles larger than the pore size of the filter element. In this manner, filter element 70 can be partially cleaned and regenerated without the need for removal from tangential flow filter assembly In one embodiment, the regeneration cycle may involve turning off pumps 32, 34 temporarily and opening valve 76 so that the pressure of coating solution 26 in tangential flow region 78 is lower than the pressure in accumulator 106. The valve 94 leading to coating apparatus 30 is closed and valve 91 is opened to direct the pressurized coating solution 26 in accumulator 106 into manifold 90. Consequently, there is a net flow of coating solution 26 from manifold 90 to tangential flow region 78. The flow of coating solution 26 dislodges accumulated particles from filter element 70. In another embodiment, it may be possible to reduce the pressure of coating solution 26 in tangential flow region 78 below the pressure in accumulator 106 by simply opening valve 76.

A controller 110 can be provided to monitor the pressure indicated by pressure transducer 74 and selectively control trans-membrane pressure regulator valve 76 to maintain an optimum pressure within tangential flow region 78 of filter assembly 72. Controller 110 may be used to control vibrators 102, 104 and pumps 32, 34. In one embodiment, controller 110 is also connected to valve 91 and the valve/flow meter 94 to operate the regeneration cycle.

Figure 2:
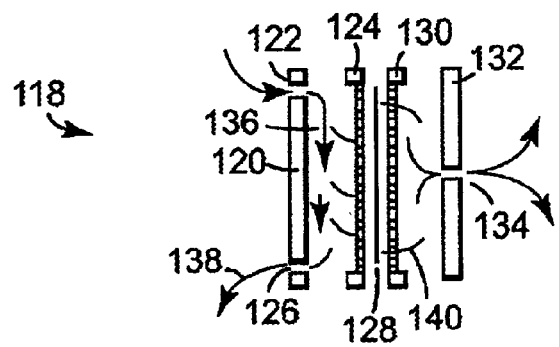
FIG. 2 is a side view of a tangential flow filter assembly for use in the system of FIG. 1.

FIG. 2 is a side view of one embodiment of a filter assembly 118 in accordance with the invention. For purposes of FIGS. 2–6, upstream refers to the left side of the drawing and downstream refers to the right side of the drawing. Filter assembly 118 may be used in a coating system as shown in FIG. 1. As shown in FIG. 2, filter assembly 118 includes an input plate 120 having an input opening 122 that receives coating solution 26 from conduit 64 and an output opening 126 fluidly coupled to conduit 80

(FIG. 1). A porous membrane 128 is preferably sandwiched between an upstream screen 124 and a downstream screen 130. A backplate 132 includes an exit port 134.

Coating solution 26 moves through a tangential flow region 136 between the upstream screen 124 and plate 120. Portion 138 of coating solution 26 passes through tangential flow region 136 and exits output opening 126, and is thereby returned to the circulation path for delivery to coating solution vessel 22. Portion 140 of coating solution 26 passes through porous membrane 128, and then flows through opening 134 at the downstream side of assembly 118 to manifold 90 (FIG. 1) for delivery to coating apparatus 30 (FIG. 1).

Figure 3:
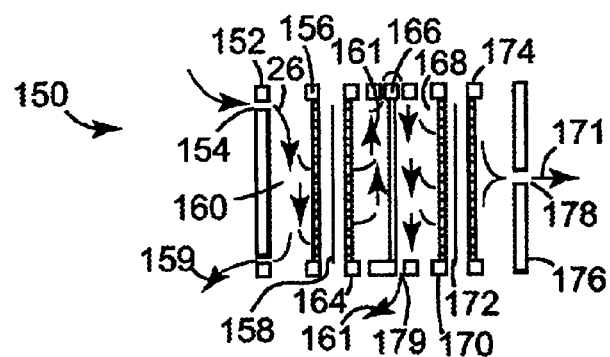
FIG. 3 is a side view of an alternative tangential flow filter assembly.

FIG. 3 is a side view of an alternative filter assembly 150 in accordance with the invention. Filter assembly 150 includes two distinct filter elements. As shown in FIG. 3, an input plate 152 includes an input opening 154 that directs coating solution 26 tangentially along screen 156 in a first tangential flow region 160. A portion 159 of the coating solution 26 passes through first tangential flow region 160 without passing through membrane 158. Portion 161 is directed around a flow distribution plate 166 located downstream from porous membrane 158 to a second tangential flow region 168.

A second tangential flow region 168 is adjacent to an upstream screen 170, a second membrane 172, and a downstream screen 174. A portion 171 of portion 161 of coating solution passes through membrane 172 and downstream screen 174 to a back-up plate 176 having an exit port 178. The remainder of portion 161 exits the second tangential flow region 168 through opening 179 and is returned to coating solution vessel 22. In an alternate embodiment, portion 161 exiting the second tangential flow region 168 may be directed to a storage chamber for subsequent use.

Figure 4:
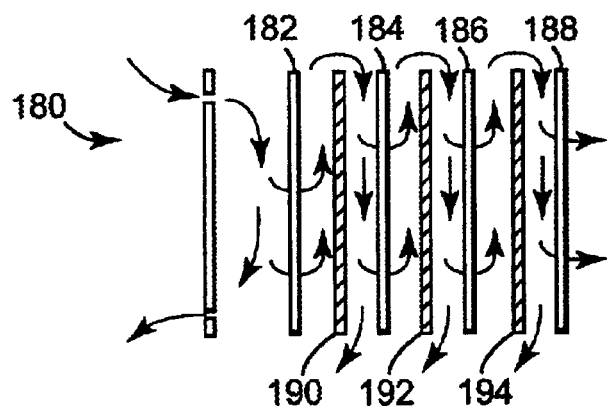
FIG. 4 is a side view of another alternative tangential flow filter assembly.

FIG. 4 is a simplified side view diagram illustrating a second alternate membrane assembly 180 in accordance with the present invention. In the example of FIG. 4, membrane assembly 180 has four membranes 182, 184, 186, 188 separated by flow distribution plates 190, 192, 194. Membranes 182, 184, 186, 188 preferably have progressively smaller pore sizes, with the upstream membrane 182 having the greatest pore size and downstream membrane 188 having the smallest pore size.

In one embodiment, membrane 182 has a pore size of approximately 20 micrometers, membrane 184 has a pore size of about 5 micrometers, membrane 186 has a pore size of about 2 micrometers and membrane 188 has the smallest pore size, e.g., on the order of approximately 0.8 micrometers. The number of membranes disposed between the upstream and downstream sides of assembly 180 can be increased or decreased for particular applications.

By providing a series of porous membranes in descending order of pore size, the filter assembly is capable of providing a variable range of particles to be delivered to the coating apparatus. The first porous membrane sets a maximum particle size for admission to the coating apparatus whereas the last porous membrane sets the minimum particle size. Any intervening membranes set intermediate particle sizes.

The coating path may be adjustable via one or more valves to take delivery of the coating solution from the output of either the first filter element, the last filter element, or any of the intermediate filter elements, each of which delivers coating solution with particle sizes determined by the pertinent pore sizes. In this manner, the particle size in the coating solution delivered to the coating apparatus can be readily selected.

One particle size may be appropriate for coating one type of article, whereas another particle size may be more appropriate for a different article. Thus, incorporation of multiple filter elements as shown in FIGS. 3 and 4 can make the particle size of the coating solution delivered to the coating path adjustable without substantial reconfiguration of the filter assembly.

For some processes, it may be desirable to supply the output of the smallest pore size filter element to the output path, e.g., a coating apparatus. In this case, the output receives only particles that are less than the pore size of the smallest pore size filter element. In other processes, however, it may be desirable to supply particles having particle sizes within a range having upper and lower bounds. In this case, particles that pass through one or more larger pore size, upstream filter elements but not one or more smaller pore size, downstream filter elements may be extracted and supplied to the output path.

By extracting the particles from different points in a series of differently sized filter elements, the upper and lower bounds of the particle size range can be made selectable. Hence, a tangential flow filter assembly can be constructed, and disposed within the circulation path, to deliver coating particles having sizes less than a first threshold size, i.e., the larger pore size of an upstream filter element, and greater than a second threshold size, i.e., the smaller pore size of a downstream filter element, from the circulation path to a coating path. This tangential flow filter assembly may return coating particles having sizes greater than the first threshold size and less than the second threshold size to the supply via the circulation path.

Figure 5:
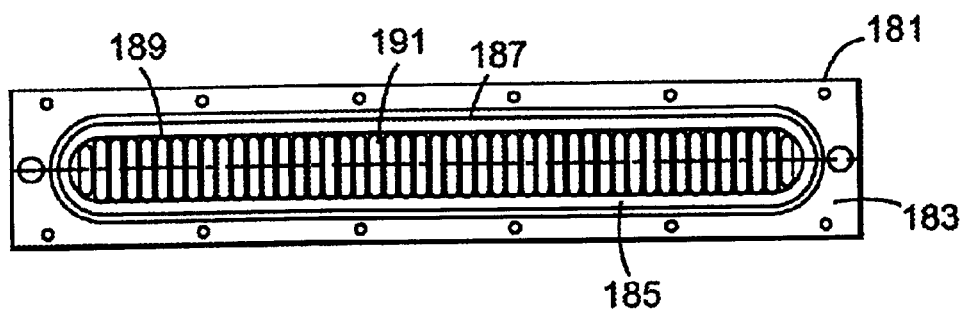
FIG. 5 is a front view of a screen plate for housing a filter element in the tangential flow filter assembly of FIG. 1.
Figure 6:
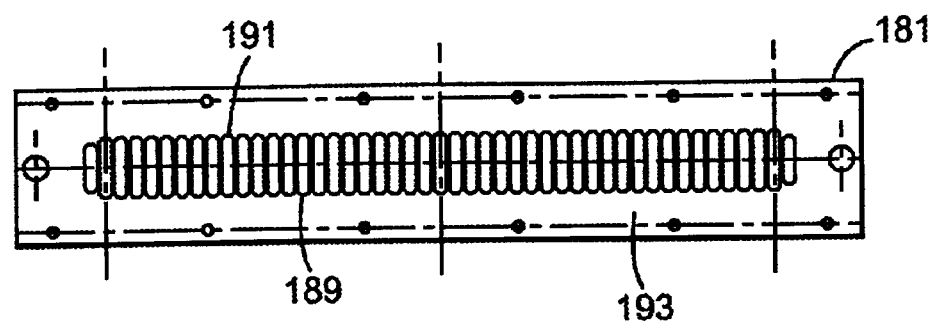
FIG. 6 is a back view of the plate of FIG. 5.

Tangential flow filter assembly 100 (FIG. 1) may comprise a series of plates fastened together to form an assembly housing. FIG. 5 is a front view of a screen plate 181 designed to house a filter element. Screen plate 181 has an upstream surface 183 that defines an aperture 185 with an outer o-ring 187. A filter element is mounted within aperture 185. Aperture 185 may include a series of machined ribs 189 that define slots 191. Slots 191 provide mechanical support to a downstream surface of a filter element while allowing coating solution and particles to pass through the filter element. Slots 191 should be small enough to afford adequate support to the filter element, but large enough so that they are not too restrictive to flow of coating solution 26. In particular, slots 191 preferably do not generate excessive pressure loss within coating solution 26. FIG. 6 is a back view of plate 181 of FIG. 5, and illustrates a downstream surface 193 of screen plate 181 and slots 191.

Figure 7:
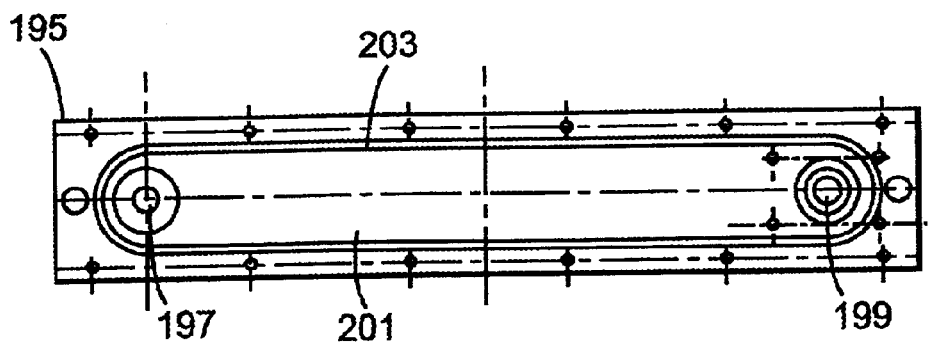
FIG. 7 is a front view of an upstream plate suitable for use in the tangential flow filter assembly of FIG. 1.

FIG. 7 is an interior view of an upstream plate 195 in tangential flow filter assembly 100 of FIG. 1. Upstream plate 195 is disposed on a side of screen plate 181 opposite the coating path. Upstream plate 195 defines an input 197 coupled to the circulation path and an output 199 coupled to the circulation path. Input 197 receives coating solution 26 from the circulation path while output 199 returns coating solution 26 to the circulation path for delivery to coating solution vessel 22. Coating solution 26 flows through a recessed area 201 that forms a tangential flow region between input 197 and output 199. Upstream plate 195 also may include an o-ring 201.

Figure 8:
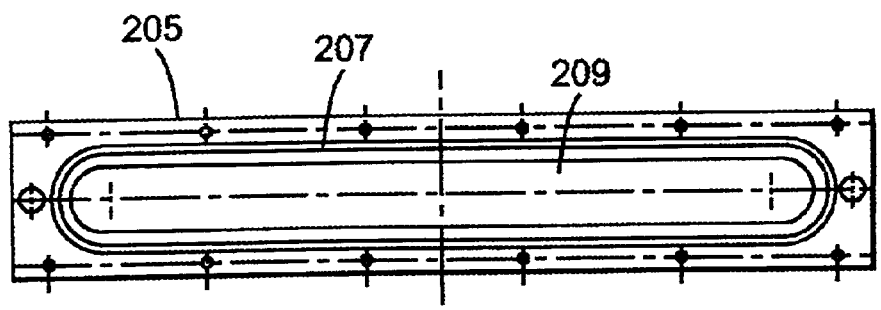
FIG. 8 is a back view of a spacer plate suitable for use in the tangential flow filter assembly of FIG. 1.

FIG. 8 is a front view of a spacer plate 205 in tangential flow filter assembly 100 of FIG. 1. Spacer plate 205 may be disposed between upstream plate 195 and screen plate 181, and serves to secure and seal a filter element within aperture 185 of screen plate 181 (FIG. 5). As shown in FIG. 8, spacer plate 205 defines an aperture 209 and a sealing o-ring 207 extending around the aperture. Aperture 209 forms part of the tangential flow region.

Figure 9:
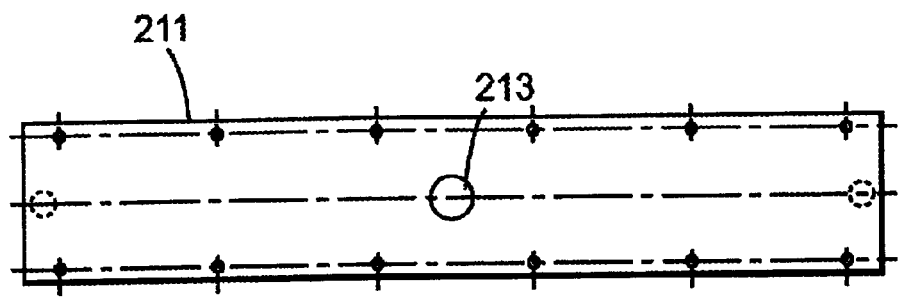
FIG. 9 is a back view of a downstream plate suitable for use in the tangential flow filter assembly of FIG. 1.

FIG. 9 is a back view of a downstream plate 211 suitable for use in tangential flow filter assembly 100 of FIG. 1. Downstream plate 211 is disposed on a downstream side of screen plate 181 and receives coating solution that passes through the filter element mounted in the screen plate. As shown in FIG. 9, downstream plate 211 defines an output 213 that is coupled to the coating path to deliver the filtered coating solution to coating apparatus 30. Although FIGS. 5–9 illustrate a single screen plate 181 and filter element, a number of screen plates and spacer plates may be disposed between upstream plate 195 and downstream plate 211 to form a series of filter elements, e.g., with progressively decreasing pore sizes.

Figure 10:
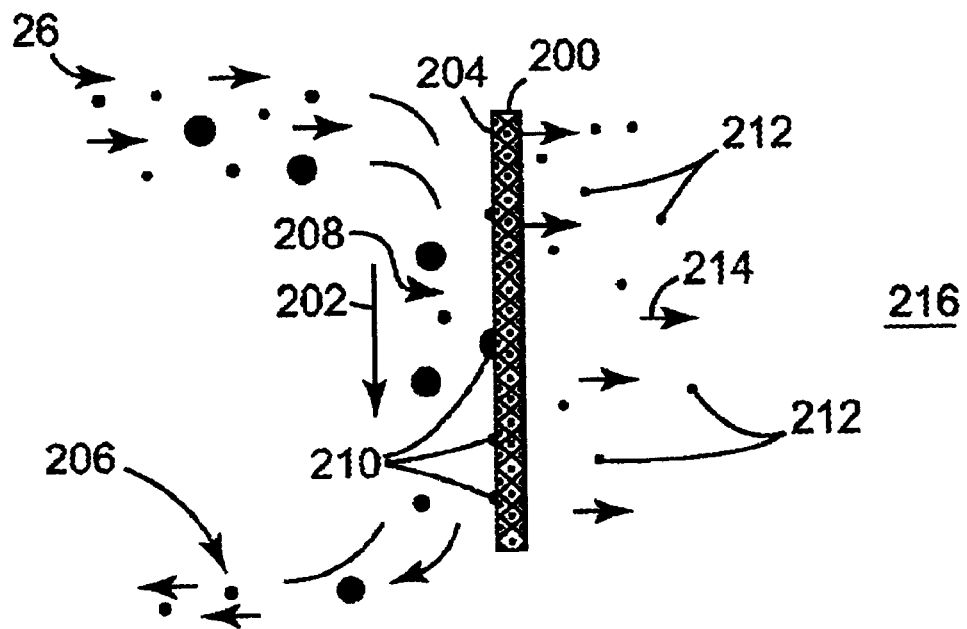
FIG. 10 is a graph illustrating flow rate versus trans-membrane pressure for a tangential flow filter assembly as shown in FIG. 2.

FIG. 10 is a schematic illustration of a filter element in the form of a porous membrane 200 interacting with a pressurized coating solution 26 in accordance with the invention. Coating solution 26 moves in a direction 202 tangentially across upstream surface 204 of membrane 200. One portion 206 of coating solution 26 flows through the tangential flow region 208 without passing through membrane 200, and is returned along the circulation path to coating solution vessel 22 (FIG. 1).

Some of particles 210 that are larger than the pore size of membrane 200 become embedded in upstream surface 204. Particles 212 that are sufficiently small to pass through membrane 200 move in direction 214 into a manifold region 216 on the opposite, downstream side of membrane 200. As discussed above, vibration of membrane 200 can dramatically reduce the amount of particles 210 that adhere to upstream surface 204 of membrane 200.

Figure 11:
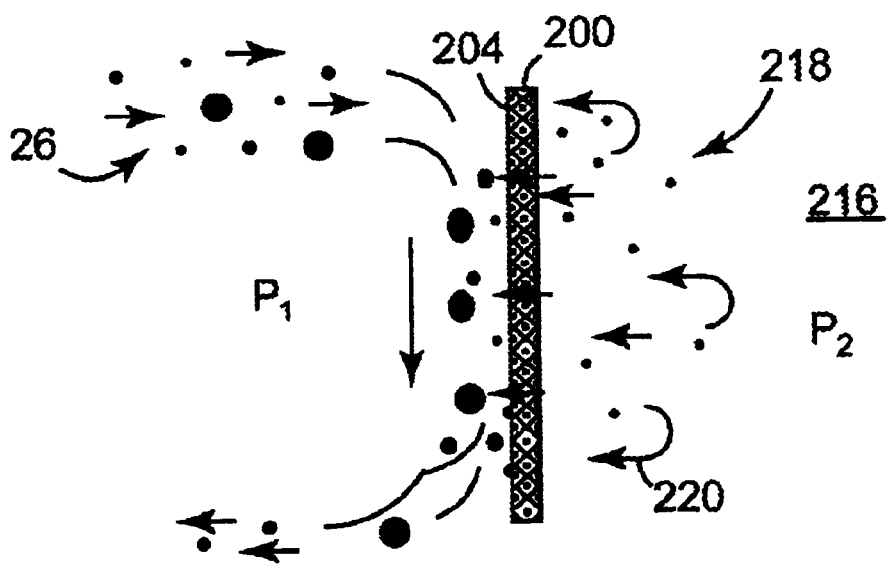
FIG. 11 is a graph illustrating flow rate versus trans-membrane pressure for a tangential flow filter assembly as shown in FIG. 2 with back-flushing.

FIG. 11 is a side schematic illustration of membrane 200 during a regeneration cycle. A portion of coating solution 218 in manifold 216 is subjected to a pressure P2 that is greater than the pressure P1 of the coating solution 26 moving tangentially across upstream surface 204 of the membrane 200. Consequently, coating solution 218 is forced back through the membrane 200 in direction 220, serving to clear particles from upstream surface 204. In particular, particles 210 accumulating on surface 204 are pushed off membrane 200 and rejoin the tangential flow of coating solution 26 for return to coating solution vessel 22. Once membrane 200 has been regenerated, i.e., substantially cleared of particles 210 accumulating on surface 204, the pressure P2 can reduced so that it is less than the pressure P1, allowing classification of additional coating solution 26 to continue.

EXAMPLE 1

The operating pressure level of a coating system substantially as shown in FIG. 1 was adjusted from about 10,000 psi (690 bars) to about 45,000 psi (3103 bars) in order to determine the effect of processing pressure conditions on the amount of downstream trans-membrane pressure that has to be applied to the coating solution in order to push the coating solution through the porous membrane. In this series of experiments, the coating solution exiting the circulation path of the system is directed through a tangential flow filter assembly having a series of porous membranes. The membranes consisted of an initial about 20 micrometer polypropylene strip, followed by a series of two 0.9 micrometer glass membranes. The glass membranes resulted in an efficiency of about 0.65 micrometers. The glass membranes were followed by a final membrane of about 20 micrometer polypropylene, which provided additional support of the upstream media.

Attached to the outside of the apparatus were two ball type vibrators. Each vibrator was a Martin Engineering Vibrator Model UCV-38 at 60 psi (4.1 bars) pneumatic pressure, resulting in about 6200 vibrations per minute, and generating about 560 pounds (254 kg) of force. The vibrators were positioned such that the induced vibration of the filter assembly occurred in two different directions simultaneously. The coating solution fed through the tangential flow filter assembly was. Results of two different coating runs are indicated in Tables 1 and 2 below, which compare pumping pressure, initial trans-membrane pressure, initial product flow, and total product throughput through the tangential flow filter assembly.

TABLE 1

| Condition | Gloss 45° | Initial Trans-membrane Pressure | Initial Product Flow | Total Product Throughput |
|---|---|---|---|---|
| 15 kpsi | 82.2 | 49 psi | 0.111 gpm | 6.0 lbs |
| 25 kpsi | 82.7 | 34 psi | 0.111 gpm | 8.8 lbs |
| 36.5 kpsi | 84.1 | 27 psi | 0.100 gpm | 10.8 lbs |
| 41.3 kpsi | 85.3 | 27 psi | 0.116 gpm | 12.8 lbs |

TABLE 2

| Condition | Gloss 45° | Initial Trans-membrane pressure | Initial Product Flow | Total Product Throughput |
|---|---|---|---|---|
| 10.1 kpsi | 81.3 | 46 psi | 0.105 gpm | 4.2 lbs |
| 20.4 kpsi | 82.7 | 32 psi | 0.111 gpm | 4.9 lbs |
| 30.1 kpsi | 83.5 | 37 psi | 0.110 gpm | 7.7 lbs |
| 45.3 kpsi | 87.5 | 25 psi | 0.110 gpm | 42.3 lbs |

EXAMPLE 2

Figure 12:
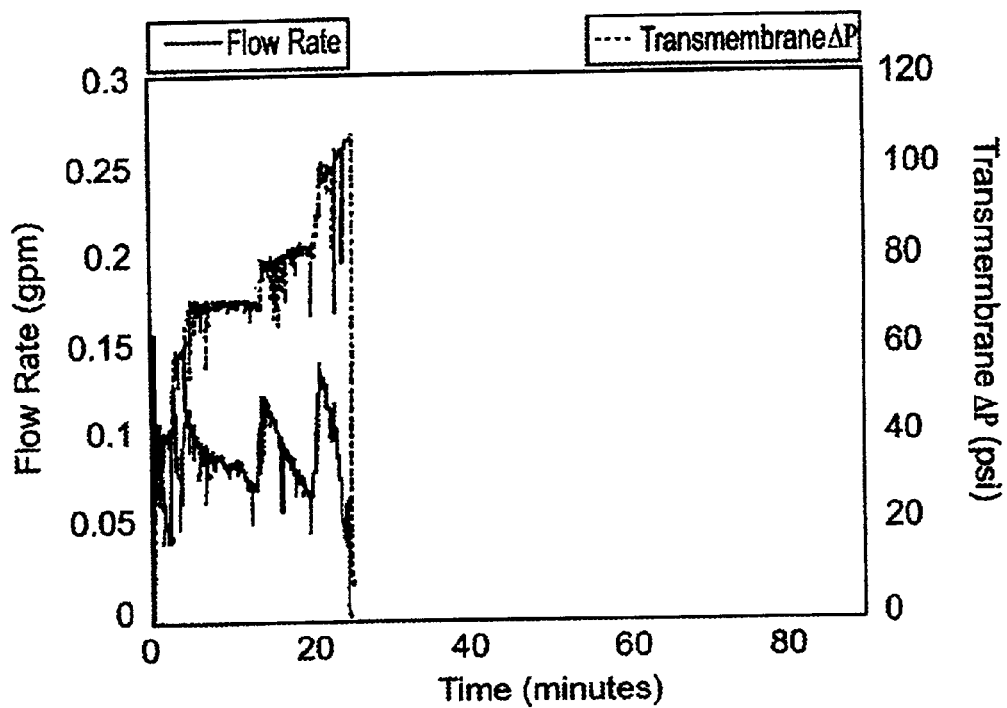
FIG. 12 is a graph illustrating flow rate versus trans-membrane pressure for a tangential flow filter assembly as shown in FIG. 2 with vibratory movement.

A series of experiments designed to improve the processing of coating solution utilizing continuous classification were performed by adding the enhancements of "backflush" processing and "vibration" of the porous membrane surface. FIG. 12 shows flow rate and trans-membrane pressure drop ($\Delta P$) data vs. processing time for a control condition in which processing of a coating solution at system pressure of about 13,000 psi (897 bars) was performed without either of the two enhancements. The experimental protocol included increasing the $\Delta P$ across the classifying membrane, a combination of an about 20 micrometer membrane, an about 0.8 micrometer membrane, and an about 20 micrometer membrane, until the flow rate reached about 0.11 gallons per minute (gpm) 0.5 liters per minute).

The classification was monitored without changing the process conditions, e.g., system pressure, filtration rating, $\Delta P$, and flow rate, until the flow rate dropped to about 0.07 gpm (0.32 liters per minute). At about 0.07 gpm (0.32 liters per minute), $\Delta P$ was increased until the flow rate was approximately 0.11 gpm (0.5 liters per minute). This protocol was followed until the $\Delta P$ was greater than about 100 psi (6.9 bars), at which the experiment was terminated. FIG. 12 shows the characteristic nature of this protocol. A step increase in $\Delta P$ results in a step increase flow rate. As $\Delta P$ held approximately steady, the flow rate decreased due to buildup of particles on the membrane surface, at which point $\Delta P$ was step increased again, resulting in a step increase of flow rate back to the starting point. Note that the time between step increases in $\Delta P$ decreases for each step.

EXAMPLE 3

Figure 13:
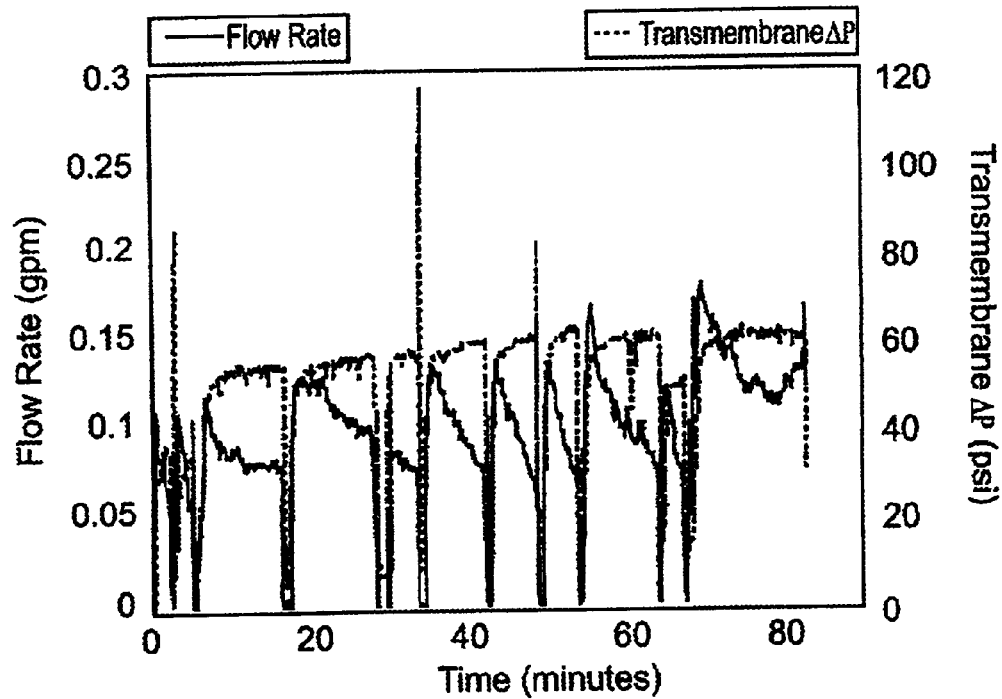
FIG. 13 is a graph illustrating flow rate versus trans-membrane pressure for a tangential flow filter assembly as shown in FIG. 2 with back-flushing and vibratory movement.

In order to increase the processing duration of the coating system between maintenance stoppages, the backflush enhancement was added. All process variables, e.g., system pressure, filter system, pore size and protocol, were the same as in Example 2. In this experiment, instead of step increasing $\Delta P$ when the flow rate dropped to about 0.07 gpm (0.32 liters per minute), backflushing of the dispersion was performed. FIG. 13 shows the results of this enhancement.

After the initial product flow rate reached about 0.11 gpm (0.5 liters per minute) upon setting $\Delta P$, the flow rate steadily dropped to about 0.07 gpm (0.32 liters per minute). The product flow was shut down by dropping $\Delta P$ to zero and backflush was introduced by pulsing air at approximately 80 psi (5.5 bars) in the reverse direction across the media. The air was applied as three intermittent pulses approximately 2–3 seconds in duration. The product flow was restarted by setting $\Delta P$ to achieve a flow rate of about 0.11 gpm (0.5 liters per minute). This protocol was continued for an extended period of time as $\Delta P$ did not climb above the cutoff point of about 100 psi (6.9 bars). In fact, $\Delta P$ held approximately steady in the range of about 5–65 psi (0.34 to 4.5 bars), unlike the experiment of Example 2 in which $\Delta P$ continually rose upon setting the flow rate at each point. The time between necessary backflushes varied but was approximately the same amount of time between $\Delta P$ steps in the Example 2 experiment.

EXAMPLE 4

Figure 14:
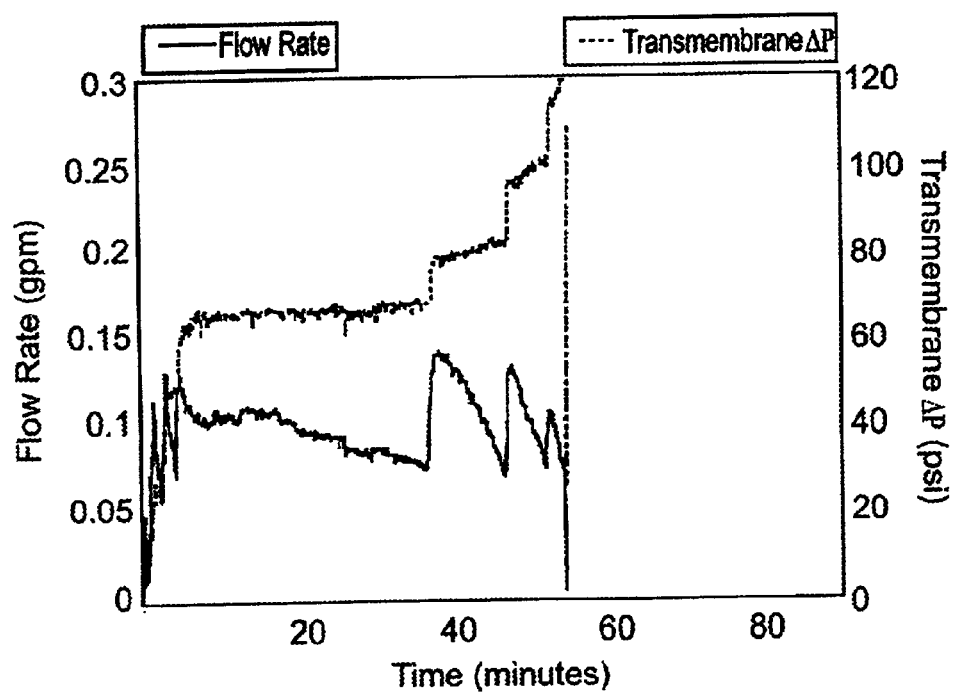
FIG. 14 is a graph illustrating trans-membrane pressure during processing in a tangential flow filter assembly using vibration.

The second enhancement, vibration of the porous membrane, was added to the control experiment conditions. All process variables, e.g., system pressure, filter system. pore size, and protocol, were the same as in Example 2. In this experiment, two vibrating plates, applied in directions perpendicular to the feed flow direction and to each other, were added to the porous membrane system housing for the purpose of reducing particle buildup. FIG. 14 shows the results of this enhancement. After the initial flow rate reached about 0.11 gpm (0.5 liters per minute) upon setting $\Delta P$, the flow rate steadily dropped to about 0.07 gpm (0.32 liters per minute), whereupon $\Delta P$ was raised until the flow rate reached about 0.11 gpm (0.5 liters per minute). This pattern of raising $\Delta P$ as the flow dropped to about 0.07 gpm (0.32 liters per minute) was continued until $\Delta P$ was greater than about 100 psi (6.9 bars), at which point the experiment was terminated. Compared to the experiment of Example 2, the time until the first increase in $\Delta P$ was extended significantly, i.e., from approximately 8 minutes to approximately 30 minutes. This vibration enhancement decreased the growth of particulate cake by adding shear to the media surface.

EXAMPLE 5

Figure 15:
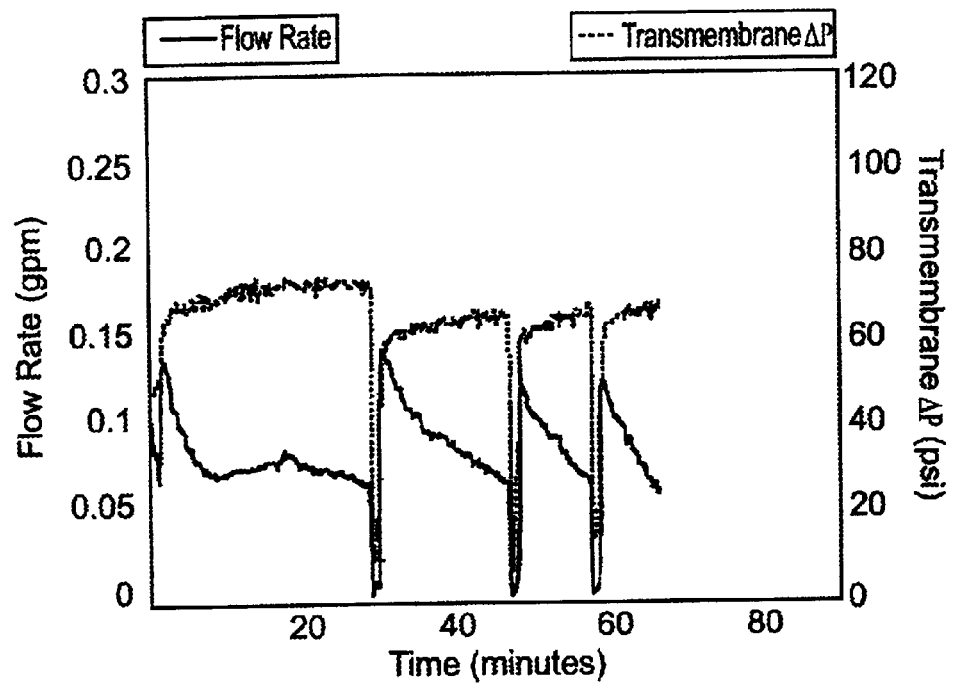
FIG. 15 is a graph illustrating trans-membrane pressure during processing in a tangential flow filter assembly using vibration.

In another experiment, both the backflushing and vibration enhancements were added. In previous experiments, backflushing allowed $\Delta P$ to remain approximately steady during the process because particle cake buildup was reversed during backflushing, while the vibration enhancement tended to slow the growth of the particle cake. This was demonstrated by the increased time for the flow rate to drop from the initial set point about 0.11 gpm (0.5 liters per minute) to about 0.07 gpm (0.32 liters per minute). Combining the two enhancements showed a combination of effects, as illustrated in FIG. 15. Backflushing when the flow rate dropped to the cutoff of about 0.07 gpm (0.32 liters per minute) allowed $\Delta P$ to remain relatively steady, while the vibrations extended the time period required between necessary backflushes, i.e., time for the flow rate to drop from about 0.11 gpm (0.5 liters per minute) to about 0.07 gpm (0.32 liters per minute).

EXAMPLE 6

To examine the effect of system pressure, the system pressure (P) applied by the intensifier pumping system was changed from approximately 0 kpsi to 45 kpsi (3.1 kBars) in 5 kpsi (0.34 kBars) intervals during processing using the same membrane system used in Examples 2–4, with vibration but without backflushing. In this series of experiments, the trans-membrane system pressure drop ($\Delta P$) was initially set such that the product flow rate was about 0.11 gpm (0.5 liters per minute). As the particle cake built up on the membrane, the flow rate dropped. When the flow rate reached about 0.07 gpm (0.32 liters per minute), $\Delta P$ was raised until the flow rate was once again at its set point of about 0.11 (0.5 liters per minute) gpm. This protocol was continued until $\Delta P$ was greater than about 100 psi, at which time the experiment was terminated. This experimental protocol was followed for each of eight system pressures of approximately 9.9 kpsi (0.68 kbars), 14.9 kpsi (1.02 kBars), 20.1 kpsi (1.39 kBars), 24.8 kpsi (1.71 kbars), 29.9 kpsi (2.06 kBars), 36.8 kpsi (2.54 kbars), 41.1 kpsi (2.83 kbars), and 44.6 kpsi (3.07 kBars).

Figure 16:
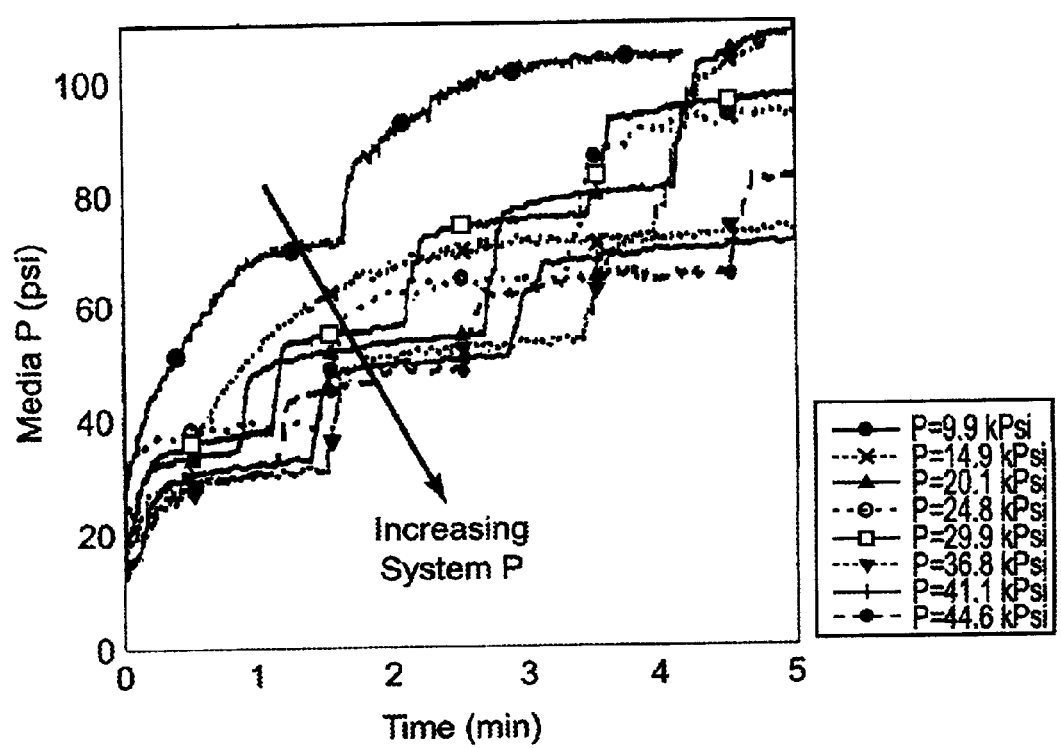
FIG. 16 is a graph illustrating trans-membrane pressure drop profiles during processing.

FIG. 16 illustrates $\Delta P$ plotted versus processing time. From the plot, a general trend emerges. As the system pressure increases, $\Delta P$ required to maintain the set point flow rate (initially set at about 0.11 gpm (0.5 liters per minute)) decreases. That is, lower $\Delta P$ is needed for higher system pressures in order to maintain a constant flow rate.

A number of embodiments of the present invention have been described. Nevertheless, it will be understood that various modifications may be made without departing from the spirit and scope of the invention. Accordingly, other embodiments are within the scope of the following claims.

What is claimed is:

1. A system comprising:
   a supply of coating solution containing substantially non-compliant coating particles;
   a pump, coupled to the supply, that delivers the coating solution along a circulation path;
   a processing apparatus, disposed within the circulation path, that processes the coating particles;
   a tangential flow filter assembly, disposed within the circulation path, that delivers coating particles having sizes less than a threshold size from the circulation path to a coating path, and returns coating particles having sizes greater than the threshold size to the supply via the circulation path, wherein the tangential flow filter assembly includes a tangential flow region that receives the coating solution from the circulation path, and a plate-like tangential flow filter element disposed between the tangential flow region and the coating path; and
   a vibration device that generates vibratory movement in the filter element in three dimensions.

2. The system of claim 1, wherein the filter element includes a porous membrane having a pore size that permits delivery of coating particles having sizes less than the threshold size across the porous membrane to the coating path.

3. The system of claim 2, further comprising a pressure regulator, disposed within the circulation path, that controls pressure across the porous membrane between the tangential flow region and the coating path.

4. A system comprising:
   a supply of coating solution containing substantially non-compliant coating particles;

a pump, coupled to the supply, that delivers the coating solution along a circulation path;

a processing apparatus, disposed within the circulation path, that processes the coating particles; and a tangential flow filter assembly, disposed within the circulation path, that delivers coating particles having sizes less than a threshold size from the circulation path to a coating path, and returns coating particles having sizes greater than the threshold size to the supply via the circulation path, wherein the tangential flow filter assembly includes a tangential flow region that receives the coating solution from the circulation path and a tangential flow filter element disposed between the tangential flow region and the coating path, wherein the filter element includes first and second filter elements arranged in series between the tangential flow region and the coating path, and the tangential flow region includes a first tangential flow region adjacent the first filter element and a second tangential flow region between the first and second filter elements, the second tangential flow region receiving coating solution and particles delivered across the first filter element, and wherein the first filter element includes a first porous membrane having a first pore size and the second filter element includes a second porous membrane having a second pore size smaller than the first pore size, the first porous membrane being disposed on a side of the tangential flow filter assembly adjacent the circulation path and the second porous membrane being disposed on a side of the tangential flow filter assembly adjacent the coating path.

5. The system of claim 1, wherein the filter element includes a first porous membrane having a first pore size and a second porous membrane having a second pore size smaller than the first pore size, the first porous membrane being disposed on a side of the tangential flow filter assembly adjacent the circulation path and the second porous membrane being disposed on a side of the tangential flow filter assembly adjacent the coating path.

6. The system of claim 5, wherein the first porous membrane defines first pores having an average diameter of less than or equal to approximately 20 microns, and the second porous membrane defines second pores having an average diameter of less than or equal to approximately 5 microns.

7. The system of claim 6, further comprising:

a third porous membrane disposed on a side of the second porous membrane opposite the first porous membrane, wherein the third porous membrane defines third pores having an average diameter of less than or equal to approximately 2 microns; and a fourth porous membrane disposed on a side of the third porous membrane opposite the second porous membrane, wherein the fourth porous membrane defines fourth pores having an average diameter of less than or equal to approximately 0.8 microns.

8. The system of claim 4, further comprising a vibration device that generates vibratory movement in the filter element in three dimensions.

9. The system of claim 4, further comprising a backflow device that applies a backflow of solution to the filter element from a side opposite the tangential flow region.

10. The system of claim 4, wherein the processing apparatus includes a jet impingement milling apparatus that reduces the size of at least some of the coating particles.

11. The system of claim 4, wherein the supply of coating solution includes magnetic particles, the system further comprising a coating apparatus, coupled to the coating path, that applies the coating solution to a moving substrate to form magnetic recording media.

12. The system of claim 4, wherein the coating solution has a solids content of greater than fifteen percent by weight.

13. A system comprising:

a supply of coating solution containing substantially non-compliant coating particles;

a pump, coupled to the supply, that delivers the coating solution along a circulation path;

a processing apparatus, disposed within the circulation path, that processes the coating particles; and a tangential flow filter assembly, disposed within the circulation path, that delivers coating particles having sizes less than a first threshold size and greater than a second threshold size from the circulation path to a costing path, and returns coating particles having sizes greater than the first threshold size and less than the second threshold size to the supply via the circulation path.

14. The system of claim 13, wherein the tangential flow filter assembly includes a first tangential flow region that receives the coating solution from the circulation path, a first tangential flow filter element disposed between the first tangential flow region and the coating path, a second tangential flow region that receives the coating solution from the first tangential flow filter element, and a second tangential flow filter element disposed on a downstream side of the second tangential flow region, and wherein the tangential flow filter assembly further includes an output path between the second tangential flow filter assembly and the coating apparatus.

15. The system of claim 14, wherein the first filter element includes a first porous membrane having a first pore size that permits delivery of coating particles having sizes less than the first threshold size across the first porous membrane, and the second filter element includes a second porous membrane having a second pore size that permits delivery of coating particles having sizes less than the second threshold size across the second porous membrane.

16. A system comprising:

a supply of coating solution containing substantially non-compliant coating particles;

a pump, coupled to the supply, that delivers the coating solution along a circulation path;

a processing apparatus, disposed within the circulation path, that processes the coating particles; and first and second tangential flow filter elements arranged in series between the circulation path and the coating path to deliver coating particles having sizes less than a threshold size from the circulation path to the coating path, wherein the first filter element has a pore size that permits delivery of coating particles having sizes less than a first threshold size and the second filter element has a pore size that permits delivery of coating particles having sizes less than a second threshold size less than the first threshold size.

17. The system of claim 16, wherein the coating solution has a solids content of greater than fifteen percent by weight.

18. The system of claim 17, further comprising a backflow device that applies a backflow of solution to at least one of the first and second filter elements from a side opposite the tangential flow region.

19. The system of claim 17, wherein the processing apparatus includes a jet impingement milling apparatus that reduces the size of at least some of the coating particles.

20. The system of claim 17, further comprising a coating apparatus, coupled to the coating path, that applies the coating solution to a moving substrate to form magnetic recording media.

21. A system comprising:
- a supply of coating solution containing substantially non-compliant coating particles;
- a pump, coupled to the supply, that delivers the coating solution along a circulation path;
- a processing apparatus, disposed within the circulation path, that processes the coating particles;
- first and second tangential flow filter elements arranged in series between the circulation path the coating path to deliver coating particles having sizes less than a threshold size from the circulation path to the coating path; and
- a vibration device that generates vibratory movement in the filter elements in three dimensions.

22. A system comprising:
- a supply of coating solution containing substantially non-compliant coating particles;
- a pump, coupled to the supply, that delivers the coating solution along a circulation path;
- a processing apparatus, disposed within the circulation path, that processes the coating particles;
- a tangential flow filter assembly, disposed within the circulation path, and having a filter element that delivers coating particles having sizes less than a threshold size from the circulation path to a coating path, and returns coating particles having sizes greater than the threshold size to the supply via the circulation path; and
- a vibration device that generates vibratory movement in the filter element in three dimensions.

23. The system of claim 22, further comprising a backflow device that applies a backflow of solution to the filter element from a side opposite the tangential flow region.

24. The system of claim 22, wherein the coating solution has a solids content of greater than fifteen percent by weight.

* * * * *